United States Patent [19]

Nachman et al.

[11] Patent Number: 5,590,200
[45] Date of Patent: Dec. 31, 1996

[54] APPARATUS AND METHOD FOR SECURING COMMUNICATION SYSTEMS

[75] Inventors: Jacob B. Nachman, Ramat Modiim; Yossef Tsuria, Jerusalem, both of Israel

[73] Assignee: News Datacom Ltd., London, England

[21] Appl. No.: 309,807

[22] Filed: Sep. 21, 1994

[30] Foreign Application Priority Data

Dec. 9, 1993 [IL] Israel .................................. 107967

[51] Int. Cl.$^6$ .............................. H04L 9/14; H04L 9/26
[52] U.S. Cl. .............................. 380/46; 380/23; 380/25; 380/21; 380/44; 380/47; 380/49
[58] Field of Search ................................ 380/23, 25, 44, 380/46, 47, 49, 21

[56] References Cited

U.S. PATENT DOCUMENTS

| | | | |
|---|---|---|---|
| 4,841,133 | 6/1989 | Gercekci et al. | 235/492 |
| 4,853,962 | 8/1989 | Brockman | 380/44 |
| 4,890,319 | 12/1989 | Seth-Smith et al. | 380/5 |
| 4,991,208 | 2/1991 | Walker et al. | 380/20 |
| 5,046,092 | 9/1991 | Walker et al. | 380/20 |
| 5,237,610 | 8/1993 | Gammie et al. | 380/10 |
| 5,341,425 | 8/1994 | Wasilewski et al. | 380/20 |
| 5,381,481 | 1/1995 | Gammie et al. | 380/49 |

FOREIGN PATENT DOCUMENTS

| | | |
|---|---|---|
| 0343805A2 | 11/1989 | European Pat. Off. . |
| 0438154A2 | 7/1991 | European Pat. Off. . |
| 0588184A1 | 3/1994 | European Pat. Off. . |
| WO85/00491 | 1/1985 | WIPO . |
| WO91/11884 | 8/1991 | WIPO . |

OTHER PUBLICATIONS

Wright, D. T., "Conditional Access Broadcasting: Datacare 2" BBC Research Dep't. Report No. 10 Aug., 1988, pp. 1–18.

Baylin, F., et al., World Satellite and Scrambling Methods. 2nd Edition, Bayline Publications 1991, pp. 243–244.

Satellite Watch News, Aug. 1991.

Primary Examiner—Gilberto Barrón, Jr.
Assistant Examiner—Hrayr A. Sayadian
Attorney, Agent, or Firm— Limbach & Limbach

[57] ABSTRACT

A hacking prevention system and method wherein the descrambler receives a data stream including a series of authorization packets and a series of corresponding offset values. A random number is generated in the descrambler. Using this random number, a key is calculated, which corresponds to the authorization packet corresponding to the generated random number. This generated key and the offset value, which corresponds to the generated random number, are used to calculate the descrambling key.

29 Claims, 6 Drawing Sheets

APPARATUS AND METHOD FOR SECURING COMMUNICATION SYSTEMS

FIELD OF THE INVENTION

The present invention relates generally to secure communication systems and more particularly to systems wherein encrypted information is transmitted from a single location to multiple terminals located at non-secure locations.

BACKGROUND OF THE INVENTION

A major problem in secure communication systems is the possibility of unauthorized penetration. Unauthorized penetration of this kind is referred to as hacking.

Several methods have been employed to overcome the problem of hacking. Encryption of transmitted data and authentication of communicators are some of the methods employed to make hacking more difficult.

One hacking method which is considered difficult to overcome is called "The McCormac Hack". This method, which is believed to be theoretically applicable to CATV systems, is described in the book "World Satellite TV and Scrambling Methods", 2nd Edition, Baylin Publications 1991, pp. 243–244 by Frank Baylin, Richard Maddox and John McCormac and in "Satellite Watch News", August 1991. According to this method, a data stream from a legitimately authorized decoder, is extracted in real time and transmitted over the air using a small radio-frequency (RF) transmitter. The data stream is then used to activate a number of pirate decoders.

SUMMARY OF THE INVENTION

The present invention seeks to provide methods and systems which substantially prevent the possibility of extracting a data stream from a legitimately authorized terminal and transmitting the data stream to a plurality of pirate terminals.

For the purposes of the present invention, the term "terminals" in all of its forms is used in a broader than usual sense to cover all types of computer terminals, CATV decoders, remote computers and remote computerized stations.

For the purposes of the present invention, the terms "seed" and "key" in all of their forms are alternately used in a broader than usual sense to cover all types of numbers or other symbols, either secret or non-secret, which are used at least as part of encryption/decryption keys to encrypt/decrypt (or scramble/descramble) data. The term "secret number" will be further used, for the purpose of the present invention, to denote the secret key which is used for encryption/decryption (or scrambling/descrambling) of data.

There is thus provided in accordance with a preferred embodiment of the present invention a hacking prevention system for use with a system including a transmitter and a multiplicity of receivers, each receiver being independently enabled by a secret number and when enabled being responsive to data received from the transmitter for decrypting encrypted information, each of the multiplicity of receivers having associated therewith:

a first key generator, employing at least part of the data and a function which differs for at least a plurality of ones of said multiplicity of receivers, for generating a first key which is different for each receiver having a different function;

a second key generator employing at least part of the data and said function to produce a second key; and a secret number generator utilizing the first key with the second key to produce said secret number which is the same for all of said multiplicity of receivers, whereby first and second keys intercepted at a first receiver cannot be effective to enable a second receiver having a different function.

Additionally in accordance with a preferred embodiment of the present invention there is provided a hacking prevention method for use with a network including a transmitter and a multiplicity of receivers, each receiver being independently enabled by a secret number and when enabled being responsive to data received from the transmitter for decrypting encrypted information, the method comprising the steps of:

generating a first key, by employing at least part of the data and a function which differs for at least a plurality of ones of the multiplicity of receivers, the first key being different for each receiver having a different function;

generating a second key by employing at least part of the data and the function; and generating a secret number by utilizing the first key with the second key to produce the secret number which is the same for all of the multiplicity of receivers, whereby first and second keys intercepted at a first receiver cannot be effective to enable a second receiver having a different function.

Additionally in accordance with a preferred embodiment of the present invention there is provided a system for selective transmission of information to a multiplicity of subscribers which subscribers may be individually characterized by at least one of the following parameters: information suppliers, geographic locations, and demographics, wherein information is transmitted from an information source to a multiplicity of subscribers which fall into different groups according to at least one of the parameters, each group being entitled to receive at least a portion of the information, the system being employed in a network including a transmitter and a multiplicity of receivers, each receiver associated with a subscriber and being independently enabled by a secret number and when enabled being responsive to data received from the transmitter for decrypting encrypted information, each of the multiplicity of receivers comprising:

a first key generator, employing at least part of the data and a function which differs for at least a plurality of ones of the multiplicity of receivers, for generating a first key which is different for each receiver having a different function;

a second key generator employing at least part of the data and the function to produce a second key;

a third key generator employing at least part of the data to provide a key which is characterized by at least one of the parameters; and a secret number generator utilizing the first key, the second key and the third key to produce the secret number which is the same for all of the multiplicity of receivers, whereby first and second keys intercepted at a first receiver cannot be effective to enable a second receiver having a different function, and whereby a third key intercepted at a receiver which forms part of a first group of receivers cannot be effective to enable a receiver which forms part of a second of the group of receivers.

Further in accordance with a preferred embodiment of the present invention there is provided a method for selective transmission of information to a multiplicity of subscribers which subscribers may be individually characterized by at least one of the following parameters: information suppliers, geographic locations, and demographics, wherein information is transmitted from an information source to a multiplicity of subscribers which fall into different groups according to at least one of the parameters, each group being entitled to receive at least a portion of the information, the method being employed in a network including a transmitter and a multiplicity of receivers, each receiver associated with a subscriber and being independently enabled by a secret number and when enabled being responsive to data received from the transmitter for decrypting encrypted information, the method comprising the steps of:

generating a first key by employing at least part of the data and a function which differs for at least a plurality of ones of the multiplicity of receivers, for generating a first key which is different for each receiver having a different function;

generating a second key by employing at least part of the data and the function to produce a second key;

generating a third key by employing at least part of the data to provide a key which is characterized by at least one of the parameters; and generating a secret number utilizing the first key, the second key and the third key to produce the secret number which is the same for all of the multiplicity of receivers, whereby first and second keys intercepted at a first receiver cannot be effective to enable a second receiver having a different function, and whereby a third key intercepted at a receiver which forms part of a first group of receivers cannot be effective to enable a receiver which forms part of a second of the group of receivers.

In accordance with a preferred embodiment of the present invention, the function which differs for at least a plurality of ones of said multiplicity of receivers, is a random generator.

Preferably, the second key generator is embodied in a single VLSI chip.

In accordance with a preferred embodiment of the present invention, the VLSI chip is mounted on a smart card.

Preferably, the first key generator, the function and the secret number generator are embodied in a single VLSI chip.

In accordance with a preferred embodiment of the present invention, the first key generator, the function, the secret number generator and the second key generator are embodied in a single VLSI chip.

Preferably, each of said multiplicity of receivers comprises at least one of said VLSI chips.

In accordance with a preferred embodiment of the invention, the network is a CATV network and said multiplicity of receivers are CATV receivers and decoders.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
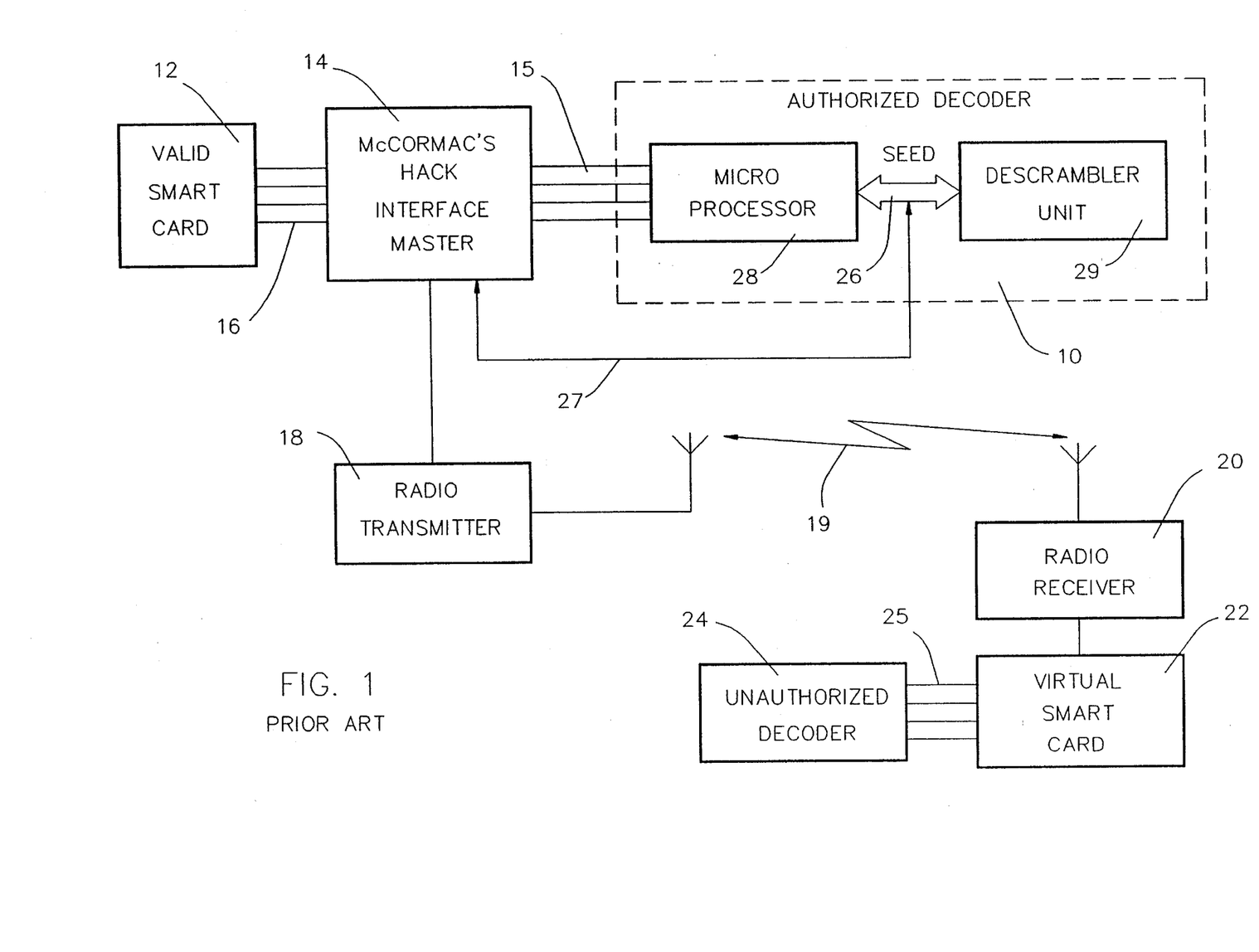
FIG. 1 is a generalized block diagram illustration of a theoretical hacking system based on the prior art "McCormac Hack" method.

Reference is now made to FIG. 1, which is a generalized block diagram illustration of a theoretical hacking system constructed and operative in accordance with the prior art "McCormac Hack" method.

An authorized decoder 10, which is normally operated by a valid smart card 12, is coupled instead to a McCormac's Hack Interface (MHI) unit 14 via a standard smart card communication link 15. Smart card 12 is also coupled to the MHI unit 14 via a standard smart card communication link 16.

MHI unit 14 "sniffs" the communication data passed between the smart card 12 and the authorized decoder 10 and provides it to a small radio transmitter 18. Radio transmitter 18 transmits the data via a radio-frequency (RF) link 19 to a radio receiver 20 which is coupled to a virtual smart card unit 22. Virtual smart card unit 22 is coupled to an unauthorized decoder 24 via a standard smart card communication link 25. In this way the unauthorized decoder 24 is operated by the same data stream that operates the authorized decoder 10.

In an alternative embodiment, MHI unit 14 "sniffs" the data which is communicated between units inside the authorized decoder 10. In this embodiment, MHI unit 14 is linked, via communication link 27, to a communication BUS 26 extending between a micro-processor 28 and a descrambling device 29. Communication BUS 26 carries the "seed" value which is the secret number required for descrambling. In this way the seed value may be extracted and transmitted to the unauthorized decoder for descrambling of the data.

Figure 2:
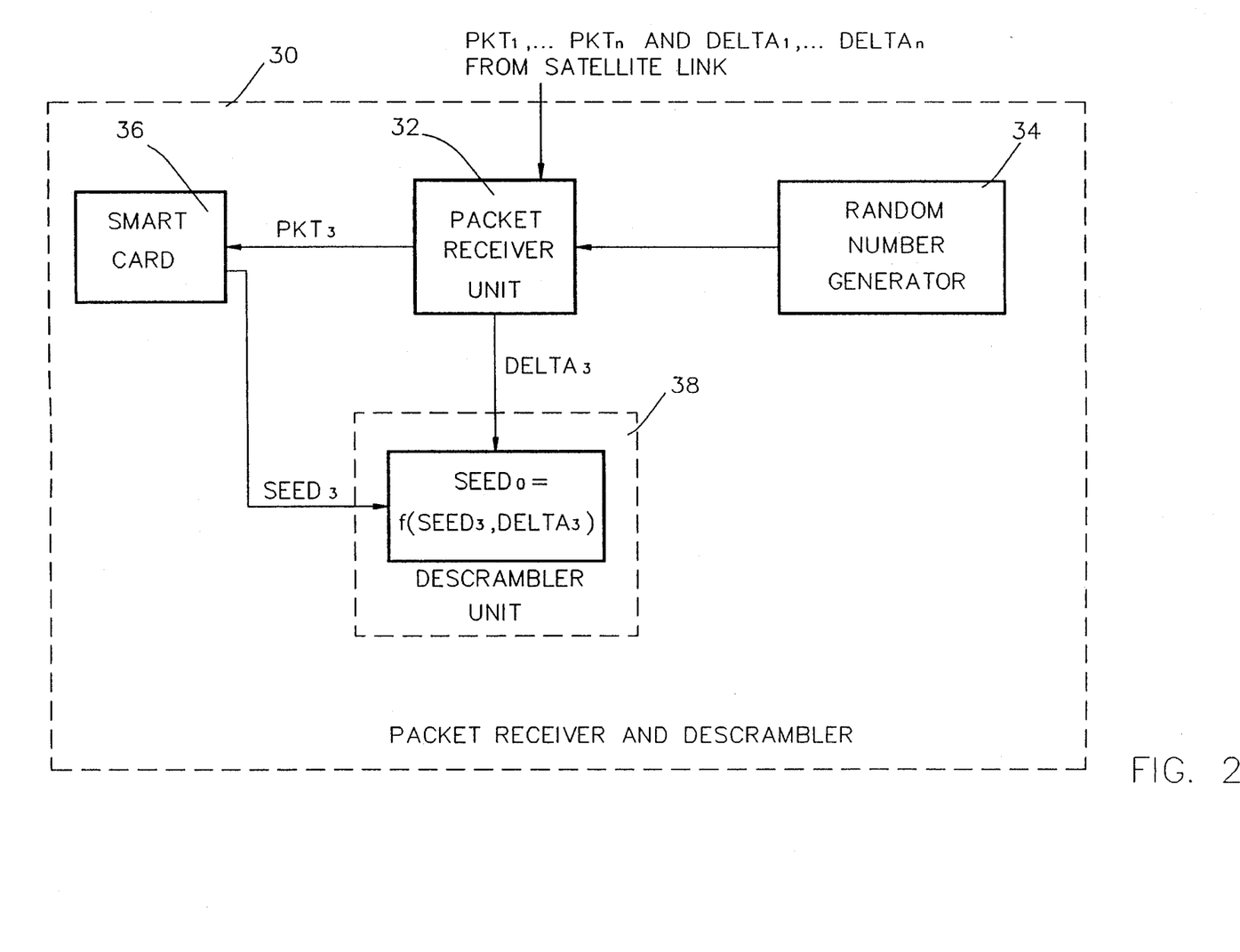
FIG. 2 is a generalized block diagram illustration of part of a subscriber unit constructed and operative in accordance with a preferred embodiment of the present invention.

Reference is now made to FIG. 2, which is a generalized block diagram illustration of part of a subscriber unit constructed and operative in accordance with a preferred embodiment of the present invention.

In accordance with a preferred embodiment of the present invention, a data stream including a series of authorization packets PKT1, . . . ,PKTn is transmitted from an information source via a satellite link, to a packet receiver and descrambler unit 30 which forms part of a subscriber's CATV receiver and decoder (not shown). A series of offset values DELTA1, . . . ,DELTAn is also transmitted via the satellite link and received by the packet receiver and descrambler unit 30. Preferably, each packet is paired with an offset value.

In the packet receiver and descrambler unit 30 a Packet Receiver Unit (PRU) 32 receives the series of packets and the offset values. A random number generator 34 provides a number in the range 1, . . . ,n to PRU 32 by employing a random number algorithm. According to the selected number, for example 3, the corresponding packet, i.e. PKT3, is transmitted to a smart card 36 and a corresponding offset value, i.e. DELTA3, which serves as an internal key, is transmitted to a descrambler unit 38.

Smart card 36 employs an algorithm which produces an appropriate seed for each packet. When smart card 36 receives PKT3 it produces a corresponding key, here termed SEED3, and provides it to the descrambler unit 38.

It is to be appreciated that PRU 32, random number generator 34 and the descrambler unit 38 are all embodied in a secure chip such as a VLSI chip. Thus, the communication of the random number and the offset value cannot be altered or "sniffed".

In the descrambler unit 38 the keys DELTA3 and SEED3 received from PRU 32 and smart card 36 respectively are employed by a function f such that:

(1) f=f(seed value, offset value), and (2) SEED0=f(SEEDi,DELTAi) for any i=1, . . . ,n, where SEED0 is the secret number required for descrambling of the data and "i" is any integer value in the series 1, . . . ,n. If the value i=3 is selected then:

(3) SEED0=f(SEED3,DELTA3).

In accordance with a preferred embodiment of the present invention, the descrambler 38 functions as a secret number generator in generating the SEED0 value and also functions as a key receiver, which receives an internal key and a key from the smart card. The SEED0 value is employed by the descrambler 38 for descrambling of the data. Inasmuch as the descrambler 38 is in a VLSI format it is considered difficult, if not practically impossible, to tap the SEED0 value.

It is to be appreciated that the hacking prevention system of FIG. 2 may be also operable with systems which do not employ smart cards. In that case the seed values corresponding to the packets PKT1, . . . ,PKTn may be calculated and produced in any suitable part of the packet receiver and descrambler 30, such as, for example, any one of PRU 32, random number generator 34 and descrambler 38, by employing an algorithm which is similar to the one employed in the smart card. Upon receipt of the selected random number from random number generator 34, the corresponding calculated seed value and the appropriate offset value are provided to descrambler unit 38.

Figure 3:
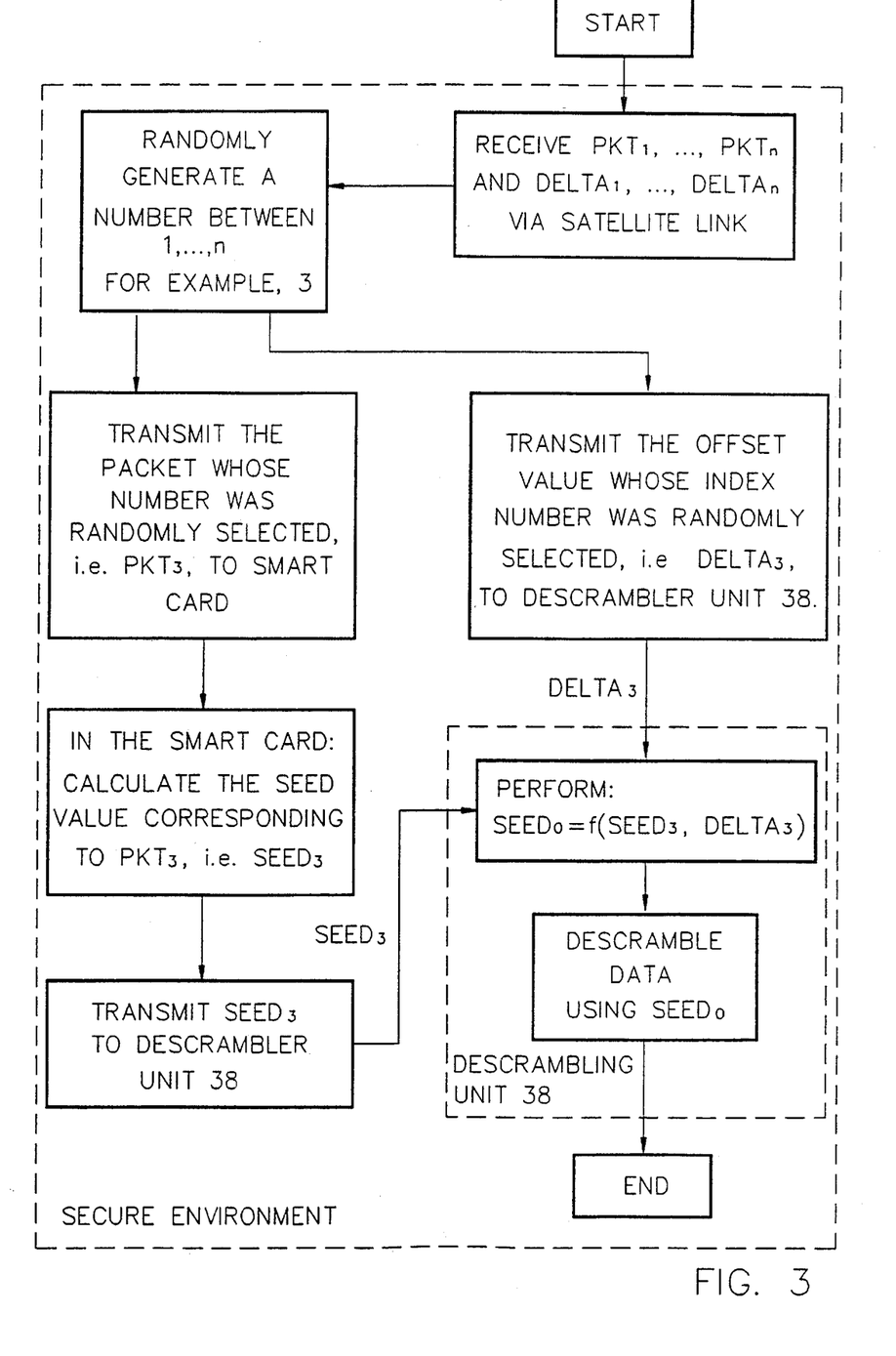
FIG. 3 is a flowchart description of the functionality of the apparatus of FIG. 2.

Reference is now made to FIG. 3 which is a flowchart description of the functionality of the apparatus of FIG. 2.

A series of data packets PKT1, . . . ,PKTn and a series of offset values DELTA1, . . . ,DELTAn are received via a satellite link. A random number generation algorithm is employed to calculate and select one of the index numbers 1, . . . ,n. The output of the random number generation algorithm is, for example the index 3. The packet whose index number was calculated, i.e. PKT3, is transmitted to the smart card. In the smart card an algorithm which calculates seeds is employed to calculate the corresponding SEED3 number. SEED3 is then transmitted to descrambler unit 38.

The offset value which corresponds to the calculated index number, i.e. DELTA3, is transmitted to the descrambling unit 38 where it is combined or otherwise utilized, by use of a secret number generator, with SEED3, to calculate a SEED0 value which is the secret number employed to descramble the satellite transmissions.

Figure 4:
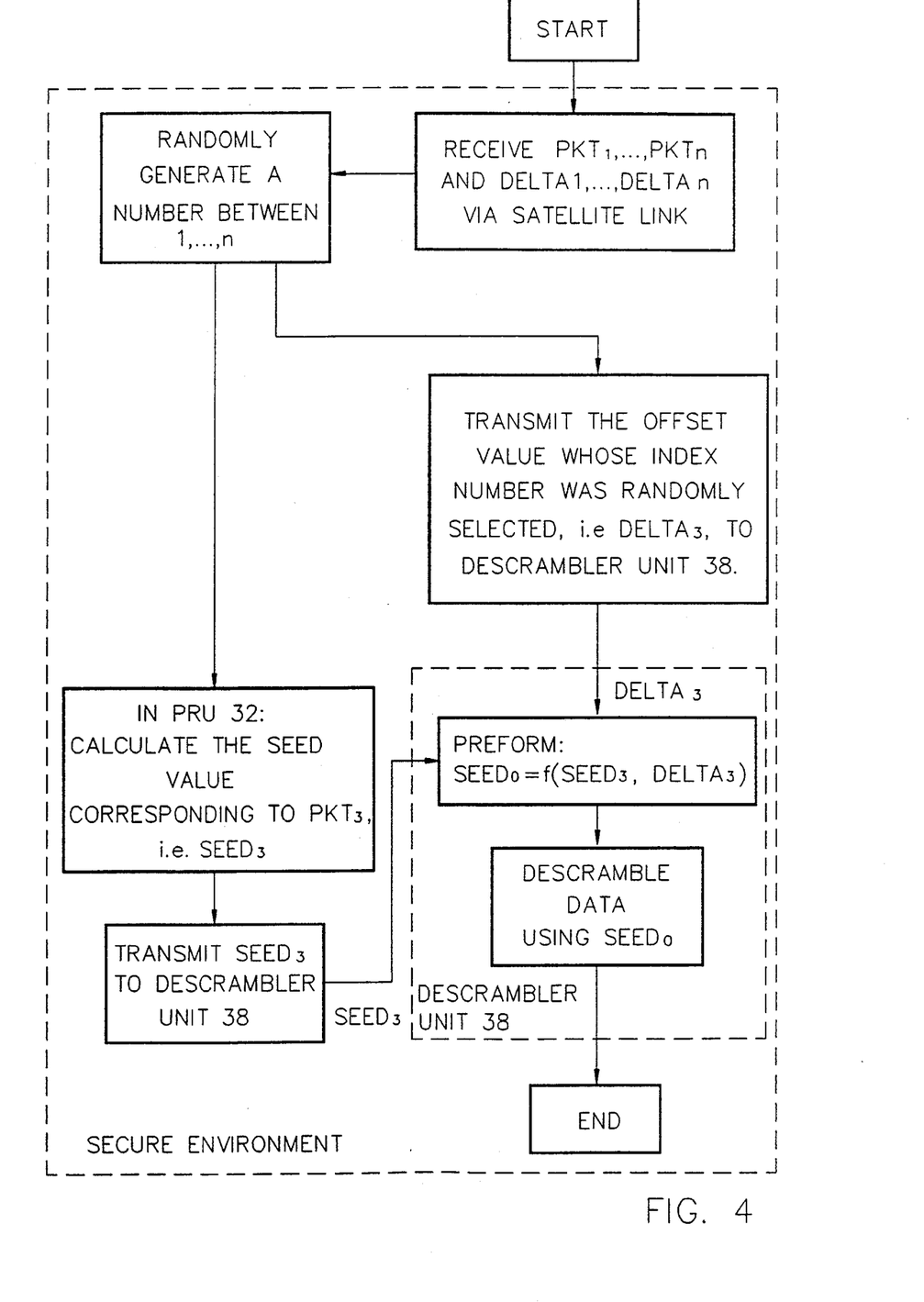
FIG. 4 is a flowchart description of the functionality of the apparatus of FIG. 2 in accordance with an alternative embodiment of the invention which does not employ conditional access cards.

Reference is now made to FIG. 4 which is a flowchart description of the functionality of the apparatus of FIG. 2 according to an alternative embodiment of the invention. The flowchart of FIG. 4 is similar to the one described in FIG. 3 except that the calculation of the seeds is not performed in a smart card but rather in PRU 32 of FIG. 2. It is to be appreciated that the calculation of the seeds is not limited to PRU 32 but may rather be performed in any part of the secure VLSI chip which forms the packet receiver and descrambler unit 30 shown in FIG. 2.

Figure 5:
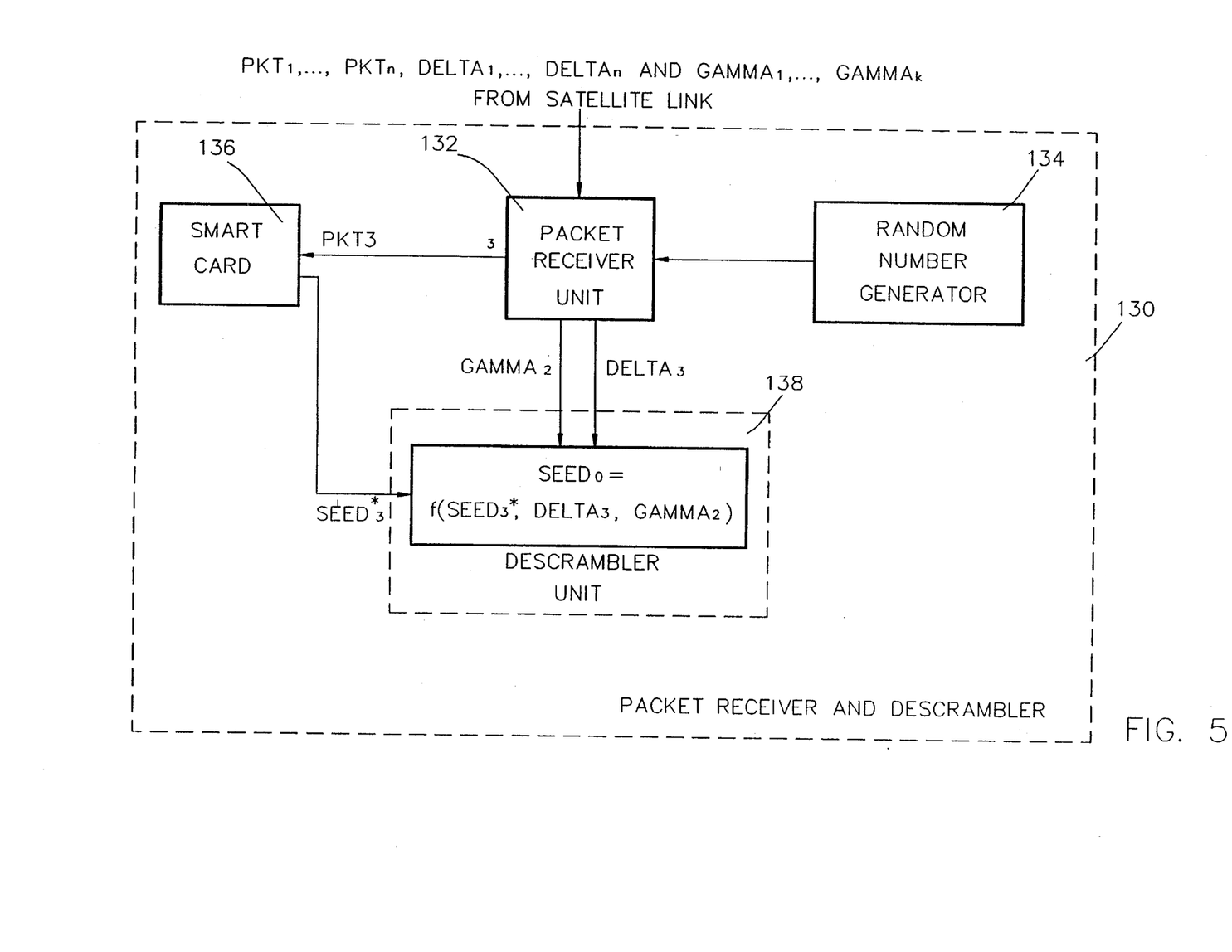
FIG. 5 is a generalized block diagram illustration of part of a subscriber unit in accordance with a preferred embodiment of the invention in which receivers characterized by different parameters are enabled with the same secret number.

Reference is now made to FIG. 5 which is a generalized block diagram illustration of part of a subscriber unit in accordance with a preferred embodiment of the invention in which receivers of information supplied by different suppliers or receivers which are otherwise distinguished from each other, as by demographics, geographic location or any other parameter, are enabled with the same secret number.

The system of FIG. 5 is similar to the system of FIG. 2 except that additional data is received from an information source via the satellite link and processed in a packet receiver and descrambler unit 130.

PRU 132 receives, via a satellite link, the following data: a series of packets PKT1, . . . ,PKTn; a series of first offset values DELTA1, . . . ,DELTAn to be employed in part of the abovementioned anti-hacking method; and a series of second offset values GAMMA1, . . . ,GAMMAk.

The series of second offset values GAMMA1, . . . ,GAMMAk is employed to distinguish between separate groups of subscribers/receivers which may be distinguished from each other on the basis of one or more criteria, such as their program suppliers, their geographic location or their demographics. Thus, each group of receivers is characterized by one of the second offset values.

Characterization of the group of receivers can be achieved either by an internal code or an internal algorithm which is entered during manufacture of each decoder, preferably in packet receiver and descrambler 130, or by an algorithm in the smart card which upon its first communication with the decoder causes the decoder to be valid for a selected parameter or group of parameters, as exemplified above. Thus, upon such characterization, each decoder is enabled to select only one of the second offset values GAMMA1, . . . ,GAMMAk.

Alternatively or additionally the characterization of the decoder may be achieved using only the first offset values. In such a case, different decoders may be set to receive only certain ones of the offset values and not others. In this way, the use of the second offset values may be obviated.

If, for example, the decoder is characterized to select GAMMA2, which defines a unique program supplier, PRU 132 will transmit GAMMA2 to descrambler unit 138. Upon selection of a random number, for example 3, by random number generator 134, PRU 132 transmits the respective data packet PKT3 to smart card 136. PRU 132 also transmits an offset value from the series of offset values DELTA1, . . . ,DELTAn according to the selected random number, i.e. DELTA3, to descrambler unit 138.

When issued, the set of smart cards for the subscribers for each group are different from the set of smart cards issued for the subscribers of another group. Differentiation is achieved by employing different algorithms in each set of smart cards. Therefore, for example, even if in two decoders, which are operated by two different information suppliers, the same random number is selected, i.e. 3, and the same data packet is transmitted to both smart cards, i.e. PKT3, each smart card calculates a different seed value, i.e. SEED3 and SEED3*.

Since each of the abovementioned two decoders is operated by a separate program supplier, different second offset values are transmitted to descrambler unit 138, for example GAMMA2 and GAMMA3 respectively.

In the descrambler units 138 of the two decoders the same secret number generator is operated such that:

(4) f=f(seed value, first offset value, second offset value);

(5) SEED0=f(SEED3, DELTA3, GAMMA2); and also (6) SEED0=f(SEED3*, DELTA3, GAMMA3 ).

It is to be appreciated that in accordance with the above-mentioned method the same SEED0 may be employed for descrambling of information originated from one source and targeted to separate groups of subscribers while preventing subscribers of one group from receiving intelligible information destined for another group.

Figure 6:
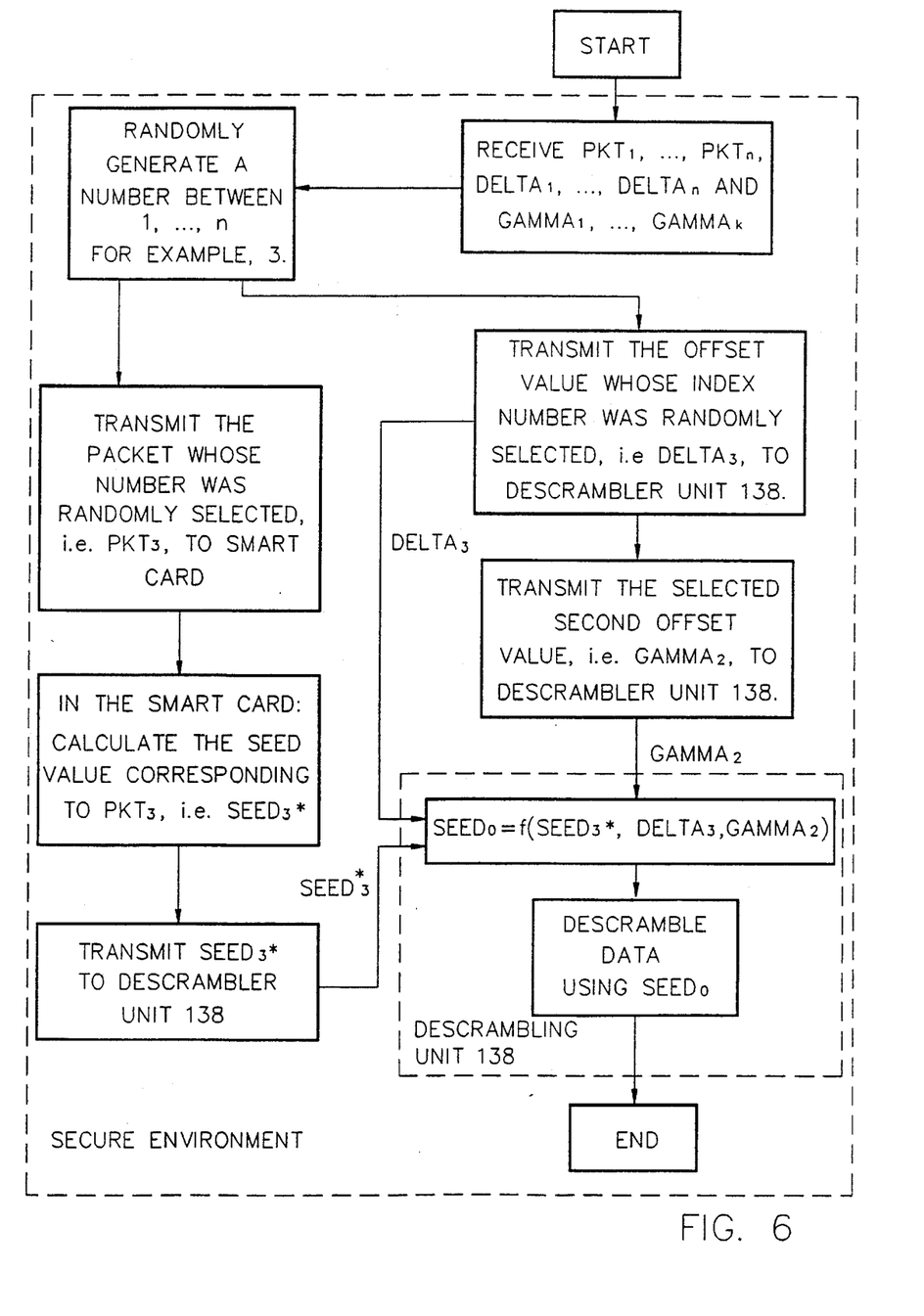
FIG. 6 is a flowchart description of the functionality of the apparatus of FIG. 5.

Reference is now made to FIG. 6 which is a flowchart description of the functionality of the apparatus of FIG. 5.

A series of data packets PKT1, . . . ,PKTn, a series of first offset values DELTA1, . . . ,DELTAn and a series of second offset values GAMMA1, . . . ,GAMMAk are received via a satellite link. A random number generation algorithm is employed to calculate and select one of the index numbers 1, . . . ,n. The output of the random number generation algorithm is, for example the index 3. The packet whose index number was calculated, i.e. PKT3, is transmitted to the smart card.

In the smart card an algorithm which calculates seeds is employed to calculate the corresponding SEED3* number. SEED3* is then transmitted to descrambler unit 138.

The first offset value which corresponds to the calculated index number, i.e. DELTA3, is transmitted to the descrambling unit 138. A second offset value which identifies a supplier or jurisdiction, for example GAMMA2, is also transmitted to descrambler unit 138.

In the descrambler unit 138 SEED3*, DELTA3 and GAMMA2 are combined, by use of a secret number generation algorithm, to calculate a SEED0 value which is the secret number employed to descramble the satellite transmissions.

It will be appreciated by persons skilled in the art that the present invention is not limited by what has been particularly shown and described hereinabove. Rather the scope of the present invention is defined only by the claims which follow:

We claim:

1. A subscriber unit in a hacking prevention system for use with a network including a transmitter which transmits information to a multiplicity of subscriber units, wherein each of the multiplicity of subscriber units is independently enabled by a descrambling secret number, and when enabled is responsive to data received from the transmitter for descrambling scrambled information, the subscriber unit comprising:

a packet receiver unit for receiving a data stream including a series of authorization packets, and a series of offset values, wherein each offset value in said series of offset values is paired with a corresponding authorization packet in said series of authorization packets;

a random number generator for providing a random number integer in the range between one and the total number of packets in said series of authorization packets;

a packet provider for providing to a removable smart card a selected packet, wherein said selected packet is a packet having a serial number in the series of authorization packets which is equal to said random number integer; and a descrambler including:

a key receiver for receiving from said removable smart card a key which uniquely corresponds to said selected packet, and for receiving from said packet provider an offset value which is paired with said selected packet; and a secret number generator utilizing the key with the offset value which is paired with said selected packet to produce said descrambling secret number, whereby said key and said selected packet intercepted at a first subscriber unit cannot be effective to enable a second subscriber unit.

2. A subscriber unit according to claim 1 and wherein the packet receiver unit, the random number generator, the packet provider, and the descrambler are embodied in a single VLSI chip.

3. A system according to claim 2 wherein each of said multiplicity of subscriber units comprises said single VLSI chip.

4. A subscriber unit according to claim 1 and wherein said network is a CATV network and said subscriber units are CATV receivers and decoders.

5. A hacking prevention method for use with a network including a transmitter which transmits information to a multiplicity of subscriber units, wherein each of the multiplicity of subscriber units is independently enabled by a descrambling secret number, and when enabled is responsive to data received from the transmitter for descrambling scrambled information, the method comprising the steps of:

receiving a data stream including a series of authorization packets, and a series of offset values, wherein each offset value in said series of offset values is paired with a corresponding authorization packet in said series of authorization packets;

generating a random number integer in the range between one and the total number of packets in said series of authorization packets;

providing a selected packet, wherein said selected packet is a packet having a serial number in the series of authorization packets which is equal to said random number integer;

producing a key which uniquely corresponds to said selected packet; and generating a descrambling secret number which is the same for all of said multiplicity of subscriber units by utilizing the key with the offset value which is paired with said selected packet, whereby said key and said selected packet intercepted at a first subscriber unit cannot be effective to enable a second subscriber unit.

6. A hacking prevention method according to claim 5 and wherein the step of generating a random number integer and the step of generating a descrambling secret number are executed in a single VLSI chip.

7. A hacking prevention method according to claim 5 and wherein the step of producing a key, the step of generating a random number integer and the step of generating a descrambling secret number are all executed in each one of said multiplicity of subscriber units.

8. A hacking prevention method according to claim 5 and wherein said method is employed in a CATV network and wherein said step of generating a random number integer and said step of generating a descrambling secret number are executed in CATV receivers and decoders.

9. A hacking prevention method according to claim 5 and wherein said step of generating a random number integer, said step of generating a descrambling secret number, and said step of producing a key are executed in a single VLSI chip.

10. A hacking prevention method according to claim 5 and wherein said step of generating a random number integer and said step of generating a descrambling secret number are executed in a first VLSI chip, and said step of producing the key is generated in a second VLSI chip.

11. A hacking prevention method according to claim 5 and wherein said step of generating a random number integer and said step of generating a descrambling secret number are executed in each one of said multiplicity of subscriber units, and said step of producing a key is executed in each one of a multiplicity of smart cards, each associated with one of said multiplicity of subscriber units.

12. A subscriber unit in a system for selective transmission of information to a multiplicity of subscribers which subscribers may be individually characterized by at least one of the following parameters: information suppliers, geographic locations, and demographics, wherein information is transmitted from an information source to a multiplicity of subscribers which fall into different groups according to at least one of said parameters, each group being entitled to receive at least a portion of the information, the system being employed in a network including a transmitter and a multiplicity of subscriber units, wherein each of the multiplicity of subscriber units is associated with a subscriber and is independently enabled by a descrambling secret number and when enabled being responsive to data received from the transmitter for descrambling scrambled information, the subscriber unit comprising:

a packet receiver unit for receiving a data stream including a series of authorization packets, a first series of offset values, and a second series of offset values, wherein each offset value in said first series of offset values is paired with a corresponding authorization packet in said series of authorization packets, and each offset value in said second series of offset values identifies a group of subscribers characterized by at least one of said parameters;

a random number generator for providing a random number integer in the range between one and the total number of packets in said series of authorization packets;

a packet provider for providing to a removable smart card a selected packet, wherein said selected packet is a packet having a serial number in the series of authorization packets which is equal to said random number integer; and a descrambler including:
    a key receiver for receiving from said removable smart card a key which uniquely corresponds to said, selected packet, and for receiving from said packet provider a first offset value which is paired with said selected packet, and a second offset value which identifies said subscriber unit as belonging to a group of subscribers characterized by at least one of said parameters; and
    a secret number generator utilizing the key, the first offset value which is paired with said selected packet, and the second offset value to produce said descrambling secret number,
    whereby said key and said selected packet intercepted at a first subscriber unit cannot be effective to enable a second subscriber unit, and
    whereby said second offset value intercepted at a subscriber unit which forms part of a first group of subscriber units cannot be effective to enable a subscriber unit which forms part of a second group of subscriber units.

13. A subscriber unit according to claim 12 and wherein the packet receiver unit, the random number generator, the packet provider and the descrambler are embodied in a single VLSI chip.

14. A system according to claim 13 wherein each of said multiplicity of subscriber units comprises said single VLSI chip.

15. A subscriber unit according to claim 12 and wherein said network is a CATV network and said subscriber units are CATV receivers and decoders.

16. A method for selective transmission of information to a multiplicity of subscribers which subscribers may be individually characterized by at least one of the following parameters: information suppliers, geographic locations, and demographics, wherein information is transmitted from an information source to a multiplicity of subscribers which fall into different groups according to at least one of said parameters, each group being entitled to receive at least a portion of the information, the method being employed in a network including a transmitter and a multiplicity of subscriber units, wherein each subscriber unit is associated with a subscriber and is independently enabled by a descrambling secret number and when enabled is responsive to data received from the transmitter for descrambling scrambled information, the method comprising the steps of:

receiving a data stream including a series of authorization packets, a first series of offset values, and a second series of offset values, wherein each offset value in said first series of offset values is paired with a corresponding authorization packet in said series of authorization packets, and each offset value in said second series of offset values identifies a group of subscribers characterized by at least one of said parameters;

generating a random number integer in the range between one and the total number of packets in said series of authorization packets;

providing a selected packet, wherein said selected packet is a packet having a serial number in the series of authorization packets which is equal to said random number integer;

producing a key which uniquely corresponds to said selected packet; and generating, at a subscriber unit, a descrambling secret number which is the same for all of said multiplicity of subscriber units by utilizing the key, a first offset value which is paired with said selected packet, and a second offset value which identifies said subscriber unit as belonging to a group of subscribers characterized by at least one of said parameters, whereby said key and said selected packet intercepted at a first subscriber unit cannot be effective to enable a second subscriber unit, and whereby said second offset value intercepted at a subscriber unit which forms part of a first group of subscriber units cannot be effective to enable a subscriber unit which forms part of a second group of subscriber units.

17. A method according to claim 16 and wherein the step of generating a random number integer and the step of generating a descrambling secret number are executed in a single VLSI chip.

18. A method according to claim 16 and wherein the step of producing a key, the step of generating a random number integer, and the step of generating a descrambling secret number are all executed in each one of said multiplicity of subscriber units.

19. A method according to claim 16 and wherein said method is employed in a CATV network and wherein said step generating a random number integer and said step of generating a descrambling secret number are executed in CATV receivers and decoders.

20. A method according to claim 16 and wherein said step of generating a random number integer, said step of generating a descrambling secret number, and said step of producing a key are executed in a single VLSI chip.

21. A method according to claim 16 and wherein said step of generating a random number integer and said step of generating a descrambling secret number are executed in a first VLSI chip, and said step of producing a key is generated in a second VLSI chip.

22. A method according to claim 16 and wherein said step of generating a random number integer and said step of generating a descrambling secret number are executed in each one of said multiplicity of subscriber units, and said step of producing a key is executed in each one of a multiplicity of smart cards, each associated with one of said multiplicity of subscriber units.

23. A hacking prevention system comprising:
a communication network;
a transmitter for transmitting, via said communication network, scrambled information associated with a series of authorization packets which are employed to authorize subscribers to access the information in clear form, and with a series of offset values, wherein each offset value in said series of offset values is paired with a corresponding authorization packet in said series of authorization packets; and
a multiplicity of subscriber units, each including:
  a communication receiver and decoder which is operative to receive said scrambled information, said series of authorization packets and said series of offset values, and to provide an output including a selected one of said authorization packets, selected in accordance with a random number algorithm; and
  a smart card, coupled to said communication receiver and decoder, and operative to receive said output including a selected one of said authorization packets and to provide to said communication receiver and decoder a key which uniquely corresponds to said selected one of said authorization packets, wherein said communication receiver and decoder employs said key and an offset value which is paired with said selected one of said authorization packets to generate a secret number which is used by said communication receiver and decoder to descramble said scrambled information, said secret number being the same for all of said multiplicity of subscriber units.

24. A hacking prevention system comprising:
a communication network;
a transmitter for transmitting, via said communication network, scrambled information associated with a series of authorization packets which are employed to authorize subscribers to access the information in clear form, with a first series of offset values, and with a second series of offset values, wherein each offset value in said first series of offset values is paired with a corresponding authorization packet in said series of authorization packets, and each offset value in said second series of offset values identifies a group of subscribers characterized by at least one of the following parameters: information suppliers, geographic locations, and demographics; and
a multiplicity of subscriber units, each including:
  a communication receiver and decoder which is operative to receive said scrambled information, said series of authorization packets, said series of first offset values, and said series of second offset values, and to provide an output including a selected one of said authorization packets, selected in accordance with a random number algorithm; and
  a smart card, coupled to said communication receiver and decoder, and operative to receive said output including a selected one of said authorization packets and to provide to said communication receiver and decoder a key which uniquely corresponds to said selected one of said authorization packets, wherein said communication receiver and decoder employs said key, a first offset value which is paired with said selected one of said authorization packets, and a second offset value which identifies said communication receiver and decoder as being part of a subscriber unit which belongs to a group of subscribers characterized by at least one of said parameters to generate a secret number which is used by said communication receiver and decoder to descramble said scrambled information, said secret number being the same for all of said multiplicity of subscriber units.

25. A subscriber unit for use with a network including a transmitter which transmits information to a multiplicity of subscriber units, wherein each of the multiplicity of subscriber units is independently enabled by a decrypting secret number, and when enabled being responsive to data received from the transmitter for decrypting encrypted information, the subscriber unit comprising:
a packet receiver unit for receiving, via said network, a data stream including a series of authorization packets, and a series of offset values, wherein each offset value in said series of offset values is paired with a corresponding authorization packet in said series of authorization packets;
a random number generator for providing a random number integer in the range between one and the total number of packets in said series of authorization packets;
a packet provider for providing to a removable smart card a selected packet, wherein said selected packet is a packet having a serial number in the series of authorization packets which is equal to said random number integer; and
a decrypter including:
  a key receiver for receiving from said removable smart card a key which uniquely corresponds to said selected packet, and for receiving from said packet provider an offset value which is paired with said selected packet; and
  a secret number generator utilizing the key with the offset value which is paired with said selected packet to produce said decrypting secret number,
  whereby said key and said selected packet intercepted at a first subscriber unit cannot be effective to enable a second subscriber unit.

26. A subscriber unit for use with a network including a transmitter which transmits information to a multiplicity of subscriber units, wherein each of the multiplicity of subscriber units is independently enabled by a descrambling secret number, and when enabled being responsive to data received from the transmitter for descrambling scrambled information, the subscriber unit comprising:

a packet receiver unit for receiving, via said network, a data stream including a series of authorization packets, and a series of offset values, wherein each offset value in said series of offset values is paired with a corresponding authorization packet in said series of authorization packets;

a random number generator for providing a random number integer in the range between one and the total number of packets in said series of authorization packets;

a packet provider for providing a selected packet, wherein said selected packet is a packet having a serial number in the series of authorization packets which is equal to said random number integer; and a descrambler including:
    a key receiver for receiving from said packet provider said selected packet and an offset value which is paired with said selected packet;
    a key producer for producing a key which uniquely corresponds to said selected packet; and
    a secret number generator utilizing the key with the offset value which is paired with said selected packet to produce said descrambling secret number,
    whereby said selected packet and said offset value which is paired with said selected packet intercepted at a first subscriber unit cannot be effective to enable a second subscriber unit.

27. A subscriber unit in a system for selective transmission of information to a multiplicity of subscribers which subscribers may be individually characterized by at least one of the following parameters: information suppliers, geographic locations, and demographics, wherein information is transmitted from an information source to a multiplicity of subscribers which fall into different groups according to at least one of said parameters, each group being entitled to receive at least a portion of the information, the system being employed in a network including a transmitter and a multiplicity of subscriber units, wherein each of the multiplicity of subscriber units is associated with a subscriber and is independently enabled by a descrambling secret number and when enabled being responsive to data received from the transmitter for descrambling scrambled information, the subscriber unit comprising:

a packet receiver unit for receiving, via said network, a data stream including a series of authorization packets, a first series of offset values, and a second series of offset values, wherein each offset value in said first series of offset values is paired with a corresponding authorization packet in said series of authorization packets, and each offset value in said second series of offset values identifies a group of subscribers characterized by at least one of said parameters;

a random number generator for providing a random number integer in the range between one and the total number of packets in said series of authorization packets;

a packet provider for providing a selected packet, wherein said selected packet is a packet having a serial number in the series of authorization packets which is equal to said random number integer; and a descrambler including:
    a key receiver for receiving from said packet provider said selected packet, a first offset value which is paired with said selected packet, and a second offset value which identifies said subscriber unit as belonging to a group of subscribers characterized by at least one of said parameters;
    a key producer for producing a key which uniquely corresponds to said selected packet; and
    a secret number generator utilizing the key, the first offset value which is paired with said selected packet, and the second offset value to produce said descrambling secret number,
    whereby said selected packet, said first offset value and said second offset value intercepted at a subscriber unit which forms part of a first group of subscriber units cannot be effective to enable a subscriber unit which forms part of a second group of subscriber units.

28. A hacking prevention method comprising:

providing a communication network including a transmitter and a multiplicity of subscriber units;

transmitting, via said communication network, scrambled information associated with a series of authorization packets which are employed to authorize subscribers to access the information in clear form, and with a series of offset values, wherein each offset value in said series of offset values is paired with a corresponding authorization packet in said series of authorization packets;

receiving, at a subscriber unit, said scrambled information, said series of authorization packets and said series of offset values;

coupling a removable smart card to said subscriber unit;

outputting, to said smart card, a selected one of said authorization packets, selected in accordance with a random number algorithm;

employing, at said smart card, the selected one of said authorization packets received thereat to produce a key which uniquely corresponds to said selected one of said authorization packets;

transmitting said key to the subscriber unit; and generating, at said subscriber unit, a secret number by employing said key and an offset value which is paired with said selected one of said authorization packets, wherein said secret number is used by said subscriber unit to descramble said scrambled information.

29. A hacking prevention method comprising:

providing a communication network including a transmitter and a multiplicity of subscriber units;

transmitting, via said communication network, scrambled information associated with a series of authorization packets which are employed to authorize subscribers to access the information in clear form, with a first series of offset values, and with a second series of offset values, wherein each offset value in said first series of offset values is paired with a corresponding authorization packet in said series of authorization packets, and each offset value in said second series of offset values identifies a group of subscribers characterized by at least one of the following parameters: information suppliers, geographic locations, and demographics;

receiving, at a subscriber unit, said scrambled information, said series of authorization packets, said series of first offset values, and said series of second offset values;

coupling a removable smart card to said subscriber unit;

outputting, to said smart card, a selected one of said authorization packets, selected in accordance with a random number algorithm;

employing, at said smart card, the selected one of said authorization packets received thereat to produce a key which uniquely corresponds to said selected one of said authorization packets;

transmitting said key to the subscriber unit; and generating, at said subscriber unit, a secret number by employing said key, a first offset value which is paired with said selected one of said authorization packets, and a second offset value which identifies the subscriber unit as belonging to a group of subscribers characterized by at least one of said parameters, wherein said secret number is used by said subscriber unit to descramble said scrambled information.

* * * * *